Dec. 11, 1923. 1,477,351

S. C. HOEY

COMPOSITE PLATE AND METHOD OF MAKING THE SAME

Filed May 12, 1919

WITNESSES:

INVENTOR
Samuel C. Hoey
BY
ATTORNEY

Patented Dec. 11, 1923.

1,477,351

UNITED STATES PATENT OFFICE.

SAMUEL C. HOEY, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE PLATE AND METHOD OF MAKING THE SAME.

Application filed May 12, 1919. Serial No. 296,569.

*To all whom it may concern:*

Be it known that I, SAMUEL C. HOEY, a citizen of the United States, and a resident of Wilkinsburg, in the county of Allegheny and State of Pennsylvania, have invented a new and useful Improvement in Composite Plates and Methods of Making the Same, of which the following is a specification.

My invention relates to composite plates and it has, for its primary object, the provision of plates formed of superimposed layers of fibrous material and a hardened binder which may be employed as insulating material for electrical purposes.

Heretofore, it has been customary to construct composite plates, which have been employed as insulating material, by employing sheets of paper or duck which were impregnated with a suitable binder, after which the sheets were stacked and subjected to heat and pressure to compact the material and harden the binder. Although exceptionally good insulating material may be formed in this manner, it is relatively expensive, which prohibits its employment where a high-grade material is not as essential as a relatively good inexpensive material. One object of my invention resides, therefore, in the provision of insulating material which shall possess the characteristics of the above mentioned material but which shall also be relatively inexpensive.

Figure 1:
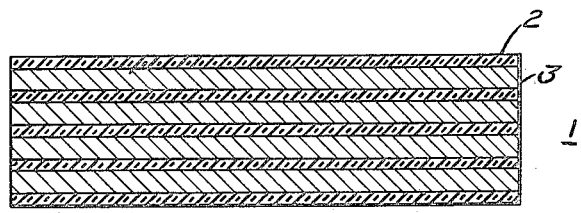
Figure 2:
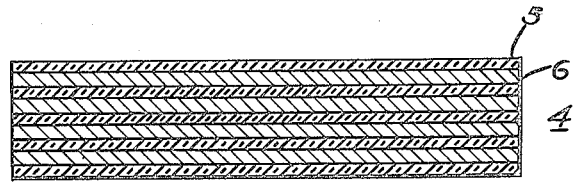

In the accompanying drawing, Fig. 1 is a sectional view of a composite plate constructed in accordance with my invention, and Fig. 2 is a similar view of a composite plate in which the relative thicknesses of material are varied from those shown in Fig. 1.

My invention will be better appreciated by a brief description of insulating material constructed by methods employed heretofore. For example, composite plates, from which may be cut various articles to be employed as insulators in electrical circuits, have been constructed by employing sheets of paper, duck or similar material. The material employed has been of selected quality in order to insure a high-grade product. Sheets of the paper or duck were impregnated with a suitable binder, such as a phenolic condensation product and the sheets were superimposed to provide a body of suitable thickness, which was then subjected to heat and pressure to compact the material and to harden the binder.

The primary object of my invention is to construct a composite plate in a manner similar to that described above but differing therefrom in that a less expensive material may be employed as a portion of the composite plate. In constructing a composite plate in accordance with my invention, I may employ a good grade of absorbent paper, such as Craft paper or Baren paper which may be cut to suitable dimensions and impregnated with a binder, such as a phenolic condensation product, after which the impregnated paper may be subjected to sufficient heat to dry the phenolic condensation product and thus facilitate the handling of the material. The sheets of impregnated paper may be stacked with alternate sheets of a substantially non-absorbent paper, such, for example, as fish paper and the stacked layers may be subjected to heat and pressure to compact the material and to harden the binder.

The fish paper, being less expensive than the absorbent paper and possessing relatively great mechanical strength, as well as good electrical insulating qualities, may be employed to increase the thickness of the composite plate and to reduce its ultimate cost. A further reduction of cost is obtained because of the fact that at least one-half of the composite plate is not impregnated with the phenolic condensation product which is, in itself, relatively expensive. Another characteristic possessed by paper, such as fish paper, which makes its employment advantageous is that a rough surface is presented which insures good binding action between it and the impregnated material.

In Fig. 1 is shown a composite plate 1 comprising layers of impregnated material 2 and interposed layers of non-impregnated material 3. The plate 1 may be constructed as above described. In Fig. 2 is shown a similar composite plate 4 comprising layers of impregnated material 5 and interposed layers of non-impregnated material 6. The plate shown in Fig. 2 may be contructed in a manner exactly similar to the plate shown in Fig. 1, the only difference being in the relative thicknesses of the layers of material employed.

Although a plurality of substantially rectangular plates have been shown, objects, such as channels, angles and various other articles of different shapes may be easily constructed by employing a suitable mold when the layers of super-imposed material are subjected to heat and pressure to compact them and to harden the binder. It may, however, be advisable, in some instances, to preform the layers of paper to the shape of the article desired before they are subjected to heat and pressure to unite them. It is desirable, in most instances, to provide the outer surfaces of the formed articles with layers of impregnated material as this insures an article which is unaffected by moisture, relatively wide temperature changes and other conditions which might affect the insulating qualities of the product.

A plate or similar article formed in accordance with my invention possesses a high mechanical strength which results from the employement of a non-absorbent material possessing exceptional mechanical strength and an absorbent material impregnated with a binder which imparts relatively great mechanical strength to the impregnated material. By providing the exposed surfaces of the article with the impregnated material, the article may be protected from conditions which might otherwise reduce its insulating qualities and, at the same time, a decorative, highly polished surface may be obtained.

I have found that a plate constructed in accordance with my invention possesses a materially greater resiliency than a composite plate formed of a single material and impregnated throughout its structure. This quality of resiliency is advantageous in some instances, as the plate has a greater resistance against sudden shocks which might otherwise break it.

Although I have specifically described a composite plate constructed in accordance with my invention, it is obvious that various other articles of a similar nature may be constructed without departing from the spirit of my invention and I desire, therefore, that no limitations shall be imposed except such as are indicated in the appended claims.

I claim as my invention:

1. A composite plate comprising super-imposed layers of impervious fibrous material and interposed layers of fibrous material impregnated with a hardened phenolic condensation product.

2. A composite plate comprising super-imposed layers of impervious fibrous material having a comparatively rough surface and layers of fibrous material impregnated with a hardened binder disposed between the layers of impervious material and a plurality of additional layers of the impregnated material disposed upon the exterior surfaces of the plate.

3. A composite plate comprising super-imposed layers of paper impregnated with a hardened phenolic condensation product and interposed layers of fish paper.

4. A method of making composite plates that comprises stacking layers of fibrous material impregnated with a binder, interposing alternate layers of impervious fibrous material and subjecting the body thus formed to heat and pressure.

5. A method of making composite plates that comprises stacking layers of fibrous material impregnated with a phenolic condensation product in an intermediate dry state, interposing alternate layers of impervious fibrous material having a relatively rough surface and subjecting the stacked material to heat and pressure to compact it and to first soften and then harden the phenolic condensation product.

6. A method of making composite plates that comprises stacking layers of absorbent paper impregnated with a phenolic condensation product, interposing alternate layers of impervious paper having a relatively rough surface and subjecting the stacked paper to heat and pressure to compact it and to harden the phenolic condensation product.

7. A composite plate comprising super-imposed layers of fibrous material, alternate layers of which possess greater mechanical strength than the remaining layers and a hardened binder uniting the layers.

8. A composite plate comprising super-imposed layers of fibrous material, alternate layers of which possess greater mechanical strength than the remaining layers and a hardened phenolic condensation product uniting the layers.

9. A composite plate comprising super-imposed layers of paper, alternate layers of which possess greater mechanical strength than the remaining layers and the layers being united by a hardened phenolic condensation product with which certain of the layers are impregnated.

10. A composite plate comprising super-imposed layers of paper, alternate layers of which possess greater mechanical strength than the remaining layers and the layers being united by a hardened phenolic condensation product with which the layers of lesser mechanical strength are impregnated.

In testimony whereof, I have hereunto subscribed my name this 26th day of April 1919.

SAMUEL C. HOEY.